(12) United States Patent
Lyublinski et al.

(10) Patent No.: US 9,121,539 B2
(45) Date of Patent: Sep. 1, 2015

(54) CORROSION MANAGEMENT SYSTEMS FOR CONTROLLING, ELIMINATING AND/OR MANAGING CORROSION

(75) Inventors: Efim Ya Lyublinski, Solon, OH (US); Keiji Uemura, Ashiya (JP); Yefim Vaks, South Euclid, OH (US); Marcelo Schultz, Rio de Janeiro (BR)

(73) Assignee: NOTHERN TECHNOLOGIES INTERNATIONAL CORPORATION, Beachwood, OH (US)

( * ) Notice: Subject to any disclaimer, the term of this patent is extended or adjusted under 35 U.S.C. 154(b) by 0 days.

(21) Appl. No.: 12/597,472

(22) PCT Filed: Apr. 25, 2008

(86) PCT No.: PCT/US2008/005384
§ 371 (c)(1),
(2), (4) Date: Apr. 1, 2010

(87) PCT Pub. No.: WO2008/134011
PCT Pub. Date: Nov. 6, 2008

(65) Prior Publication Data
US 2011/0260443 A1    Oct. 27, 2011

Related U.S. Application Data

(60) Provisional application No. 60/926,315, filed on Apr. 26, 2007.

(51) Int. Cl.
| F16L 55/00 | (2006.01) |
| F16L 58/04 | (2006.01) |
| C23F 11/00 | (2006.01) |
| C23F 11/02 | (2006.01) |
| F16L 58/10 | (2006.01) |
| F16L 58/18 | (2006.01) |

(52) U.S. Cl.
CPC ............... F16L 58/04 (2013.01); C23F 11/00 (2013.01); C23F 11/02 (2013.01); F16L 58/10 (2013.01); F16L 58/18 (2013.01)

(58) Field of Classification Search
USPC ............................ 285/45, 47, 49, 53
See application file for complete search history.

(56) References Cited

U.S. PATENT DOCUMENTS

| 2,829,080 | A |   | 4/1958 | Fessler et al. |         |
| 3,724,491 | A | * | 4/1973 | Knudsen et al. | 137/375 |
| 4,013,099 | A | * | 3/1977 | Gerigk et al.  | 138/109 |
| 4,112,967 | A | * | 9/1978 | Withem         | 137/375 |
| 4,207,918 | A | * | 6/1980 | Burns et al.   | 137/375 |

(Continued)

FOREIGN PATENT DOCUMENTS

| GB | 2375156 A | 11/2002 |
| JP | 53096491  | 8/1978  |

*Primary Examiner* — Daniel P Stodola
*Assistant Examiner* — Gwendolyn Driggers
(74) *Attorney, Agent, or Firm* — Hudak, Shunk & Farine Co. LPA

(57) ABSTRACT

A corrosion management system is designed to deliver corrosion protection and/or the management of corrosion to a connector, a connection, a welded joint, or some other type of interface (e.g., a valve joint used to join to portions of piping). In another embodiment, the system is designed to deliver at least one form of corrosion, UV, salt spray, and/or fire damage protection, mitigation and/or the management to a connector, a connection, a welded joint, or some other type of interface (e.g., a flange used to join to portions of piping).

17 Claims, 12 Drawing Sheets

(56) References Cited

U.S. PATENT DOCUMENTS

| | | |
|---|---|---|
| 4,275,835 A | 6/1981 | Miksic et al. |
| 4,290,912 A | 9/1981 | Boerwinkle et al. |
| 4,556,082 A * | 12/1985 | Riley et al. .................... 137/375 |
| 4,696,324 A * | 9/1987 | Petronko ........................ 137/375 |
| 4,944,916 A | 7/1990 | Franey |
| 4,973,448 A | 11/1990 | Carlson et al. |
| 5,154,886 A | 10/1992 | Franey et al. |
| 5,320,778 A * | 6/1994 | Miksic et al. ............ 252/389.54 |
| 5,393,457 A | 2/1995 | Miksic et al. |
| 5,756,007 A | 5/1998 | Franey |
| 5,855,975 A | 1/1999 | Miksic et al. |
| 5,959,021 A | 9/1999 | Franey |
| 6,111,194 A | 8/2000 | Kroulik |
| 6,156,140 A * | 12/2000 | Ayres .............................. 156/66 |
| 6,244,290 B1 * | 6/2001 | Reicin et al. ................... 137/312 |
| 6,488,998 B1 | 12/2002 | Crook |
| 6,551,552 B1 * | 4/2003 | Lyublinski et al. ............... 422/9 |
| 6,554,071 B1 | 4/2003 | Reddy et al. |

* cited by examiner

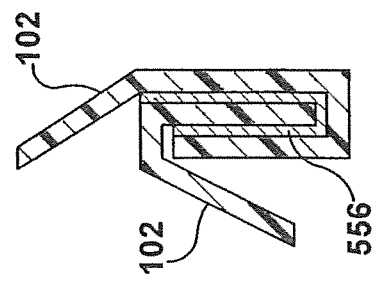
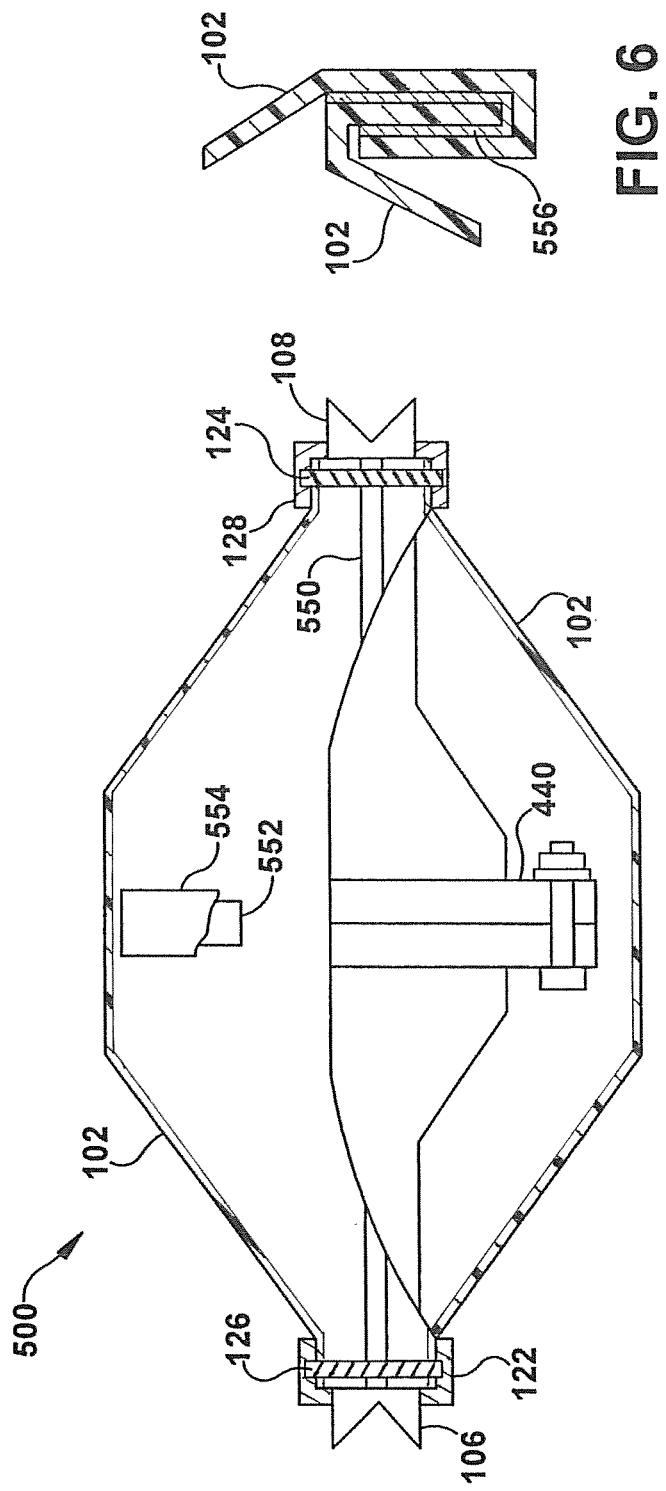

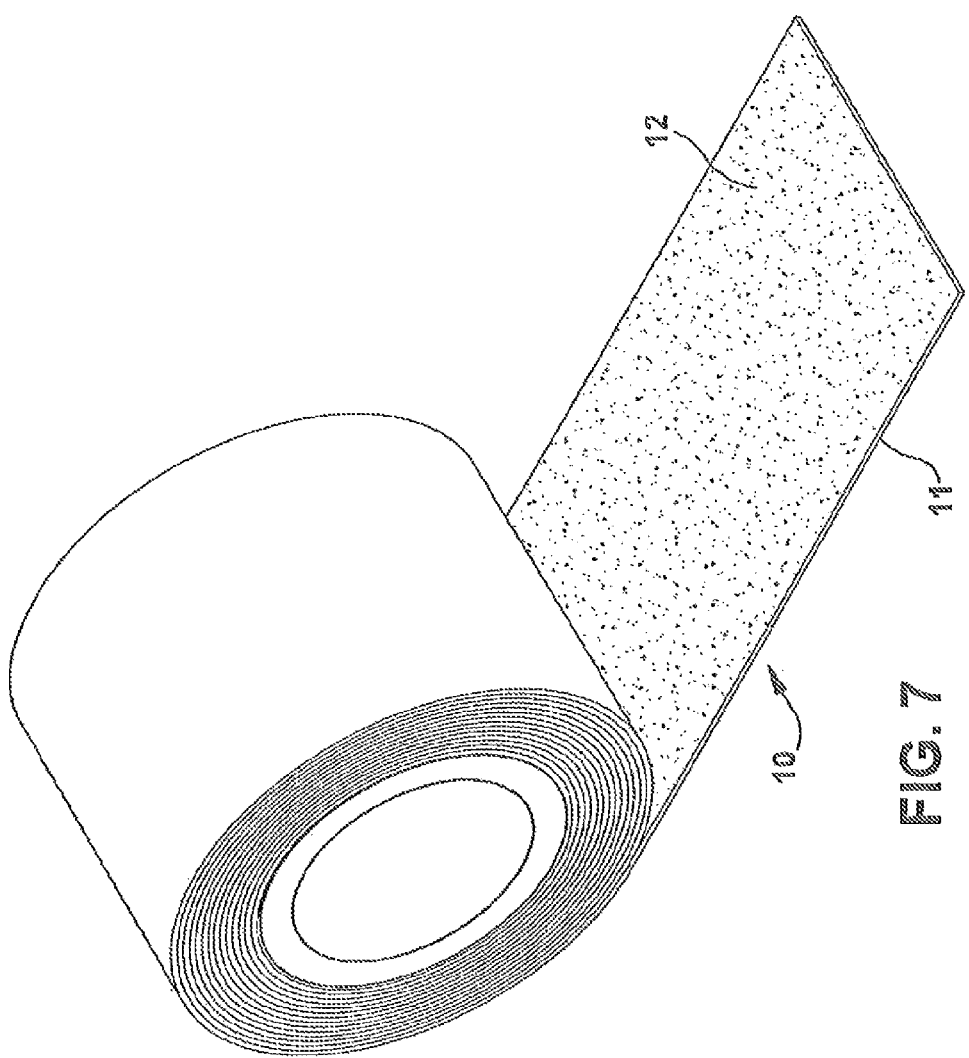

CORROSION MANAGEMENT SYSTEMS FOR CONTROLLING. ELIMINATING AND/OR MANAGING CORROSION

FIELD OF THE INVENTION

The present invention generally relates to corrosion management systems designed to deliver corrosion protection and/or the management of corrosion to a connector, a connection, a welded joint, or some other type of interface (e.g., a valve joint used to join to portions of piping). In another embodiment, the present invention relates to systems designed to deliver at least one form of corrosion, UV, salt spray, and/or fire damage protection, mitigation and/or the management to a connector, a connection, a welded joint, or some other type of interface (e.g., a flange used to join to portions of piping). In still another embodiment, the present invention relates to a corrosion management systems designed to deliver corrosion protection and/or the management of corrosion to a connector, a connection, a welded joint, or some other type of interface (e.g., a flange used to join to portions of piping) that utilizes at least one corrosion inhibiting compound provided by a structure that comprises, in part, a cover that is designed to surround at least one portion of the connector, the connection, the welded joint, or some other type of interface to be protected.

BACKGROUND OF THE INVENTION

Various systems are currently available that are designed to protect a connector, a connection, a welded joint, or some other type of interface (e.g., a flange used to join to portions of piping) from at least one form of corrosion. Such systems are generally gasket based, leak preventing systems, rigid covers, or grease-based coating systems. However, given the current systems available, generally two or more such systems are needed to fully protect a connection, a welded joint, or some other type of interface (e.g., a flange used to join to portions of piping) from at least one form of corrosion.

Given this there is a need in the art for a broad based protection system that not only protects a connection, a welded joint, or some other type of interface (e.g., a flange used to join to portions of piping) from at least one form of corrosion, but also protects against at least one other form of degradation such as UV damage, salt spray, fire damage, etc.

SUMMARY OF THE INVENTION

The present invention generally relates to corrosion management systems designed to deliver corrosion protection and/or the management of corrosion to a connector, a connection, a welded joint, or some other type of interface (e.g., a valve joint used to join to portions of piping). In another embodiment, the present invention relates to systems designed to deliver at least one form of corrosion, UV, salt spray, and/or fire damage protection, mitigation and/or the management to a connector, a connection, a welded joint, or some other type of interface (e.g., a flange used to join to portions of piping). In still another embodiment, the present invention relates to a corrosion management systems designed to deliver corrosion protection and/or the management of corrosion to a connector, a connection, a welded joint, or some other type of interface (e.g., a flange used to join to portions of piping) that utilizes at least one corrosion inhibiting compound provided by a structure that comprises, in part, a cover that is designed to surround at least one portion of the connector, the connection, the welded joint, or some other type of interface to be protected.

In one embodiment, the present invention relates to a joint cover device comprising: at least one polymer-based cover portion, wherein each cover portion is both durable and watertight and is designed to surround at least one joint formed at the confluence of at least two pipes; and at least one securing structure per pipe for securing the at least one polymer-based cover portion around each of the two or more pipes, wherein each of the at least polymer-based cover portion further comprise either one or more volatile, or vapor phase, corrosion inhibitors within each of the polymer-based cover portions, or one or more corrosion inhibiting capsules within the one or more interior areas formed from the at least one polymer-based cover portion.

In another embodiment, the present invention relates to a joint cover device comprising: at least one polymer-based cover portion, wherein each cover portion is both durable and watertight and is designed to surround at least one joint formed at the confluence of at least two pipes; at least one securing structure per pipe for securing the at least one polymer-based cover portion around each of the two or more pipes; and at least one access seam formed within each of the cover portions, wherein the access seam is designed to permit access to the joint protected by the joint cover, wherein each of the at least polymer-based cover portion further comprise either one or more volatile, or vapor phase, corrosion inhibitors within each of the polymer-based cover portions, or one or more corrosion inhibiting capsules within the one or more interior areas formed from the at least one polymer-based cover portion.

In still another embodiment, the present invention relates to a joint cover device comprising: at least two polymer-based cover portions, wherein each cover portion is both durable and watertight and is designed to surround at least one joint formed at the confluence of at least two pipes; and at least one securing structure per pipe for securing each of the at least two polymer-based cover portions around each of the two or more pipes, wherein one of the at least two polymer-based cover portions further comprises either one or more volatile, or vapor phase, corrosion inhibitors within the polymer-based cover portion, or one or more corrosion inhibiting capsules within the one or more interior areas formed from the at least one polymer-based cover portion, and wherein the second of the at least two polymer-based cover portions further comprises either one or more desiccant compounds within the polymer-based cover portion, or one or more desiccant capsules within the interior area formed from the second polymer-based cover portion.

BRIEF DESCRIPTION OF THE DRAWINGS

FIG. 5 is a cross-sectional illustration of a joint protection system according to yet another embodiment of the present invention;

FIG. 6 is a cross-sectional illustration of the seam line of FIG. 5;

FIG. 7 is a perspective illustration of a roll of tape in accordance with one embodiment of the present invention;

DETAILED DESCRIPTION OF THE INVENTION

Figure 1:
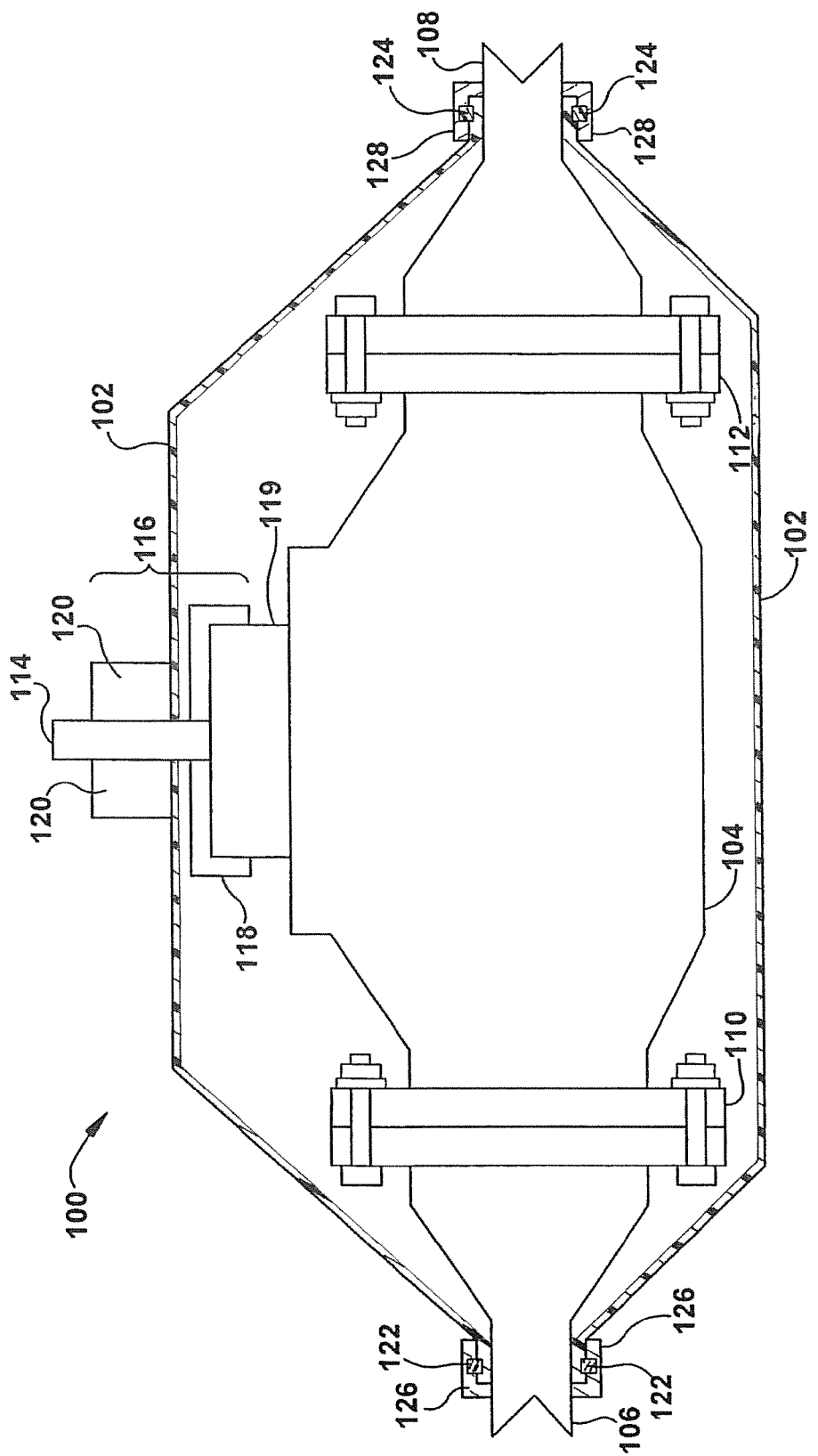
FIG. 1 is a cross-sectional illustration of a joint protection system according to one embodiment of the present invention.

The present invention generally relates to corrosion management systems designed to deliver corrosion protection and/or the management of corrosion to a connector, a connection, a welded joint, or some other type of interface (e.g., a valve joint used to join to portions of piping). In another embodiment, the present invention relates to systems designed to deliver at least one form of corrosion, UV, salt spray, and/or fire damage protection, mitigation and/or the management to a connector, a connection, a welded joint, or some other type of interface (e.g., a flange used to join to portions of piping). In still another embodiment, the present invention relates to a corrosion management systems designed to deliver corrosion protection and/or the management of corrosion to a connector, a connection, a welded joint, or some other type of interface (e.g., a flange used to join to portions of piping) that utilizes at least one corrosion inhibiting compound provided by a structure that comprises, in part, a cover that is designed to surround at least one portion of the connector, the connection, the welded joint, or some other type of interface to be protected.

Initially, the systems of the present invention can be utilized by themselves or in conjunction with one or more additional systems designed to reduce, eliminate, mitigate and/or manage corrosion in at least one other portion of a pipeline, enclosure of other structure which contains, or is in communication with, the connector, the connection, the welded joint, or some other type of interface being protected (e.g., bolts, nuts rivets, etc).

Additionally, as used throughout the text and claims, corrosion includes not only tarnishing, rusting and other forms of corrosion, but also includes any detrimental or unwanted degradation of an article to be protected. As such, when the phrases "corrosion inhibiting compound(s)" or "corrosion inhibitor(s)" are used herein, these phrases also include tarnish inhibiting compound(s) or tarnish inhibitor(s). In one embodiment, the corrosion inhibiting compound or compounds utilized in conjunction with the present invention are selected from one or more volatile or vapor phase corrosion inhibitors, one or more soluble corrosion inhibitors, or any suitable combinations thereof.

As used throughout the text and claims, corrosion inhibitor means any compound, whether volatile or not, which inhibits at least one form of corrosion or degradation from occurring on an object to be protected. As used throughout the text and claims, a soluble corrosion inhibitor means any compound, be it solid, liquid, or gas that is soluble in at least one liquid. As used throughout the text and claims, volatile phase corrosion inhibitor and vapor phase corrosion inhibitor are used interchangeably and both mean that such types of corrosion inhibitors are transferred to the surface of the item/article/surface to be protected by condensation of the volatile/vapor phase corrosion inhibitor's vapor on the surface of the item/article/surface to be protected.

In the case where the present invention utilizes a volatile or vapor phase corrosion inhibitor, any suitable volatile or vapor phase corrosion inhibitors can be used in this portion of the present invention. U.S. Pat. Nos. 4,290,912; 5,320,778; and 5,855,975 disclose vapor phase or volatile corrosion inhibitors, and are incorporated herein by reference in their entirety for their teachings of such compounds. For example, useful vapor phase or volatile corrosion inhibitors include, but are not limited to, benzotriazole, and mixtures of benzoates of amine salts with benzotriazole, nitrates of amine salts, and $C_{13}H_{26}O_2N$.

In one embodiment, the devices of the present invention are illustrated in FIGS. 1 through 5. As can be seen in FIGS. 1 through 5, the devices of the present invention can, in one embodiment, be designed to protect a valve joint between two portions of piping. In one embodiment, a device in accordance with the present invention is designed to be utilized in connection with a valve joint that has flange portions. As is noted above, the devices of the present invention are designed to deliver at least one form of protection and/or mitigation against one or more adverse effects (e.g., UV damage, corrosion damage, acid rain damage, fire damage, etc.) to at least one connection, welded joint, or some other type of interface.

In another embodiment, the devices of the present invention provide corrosion protection and/or mitigation in conjunction with at least one other form of protection and/or mitigation. In the present invention, where a corrosion inhibitor is utilized, any corrosion inhibitor can be utilized in conjunction with the devices of the present invention. For example, liquid, gas, or even solid corrosion inhibitors can be utilized in conjunction with the present invention. In another embodiment, the present invention is designed to deliver, via at least one dispenser, at least one volatile or vapor phase corrosion inhibitor.

In still another embodiment, any suitable compound and/or device that mitigates, reduces, and/or eliminates an adverse effect (e.g., UV damage, corrosion damage, acid rain damage, fire damage, etc.) can be used in conjunction with the present invention.

It should be noted that although the Figures of the present invention illustrate certain embodiments, the present invention is not limited thereto. Instead, the concepts disclosed herein should be broadly construed. As such, various other embodiments of the present invention, although not specifically shown, are possible and are included within the scope of the present invention.

Given the above, the present invention is, in one embodiment, a combination of a suitable impermeable cover designed to protect at least one connection, welded joint, or some other type of interface from at least one adverse compound or effect, at least one securing system for securing such a cover to the connection, welded joint, or some other type of interface to be protected. Also included therein is some delivery system by which to deliver at least one corrosion inhibiting compound, or some other type of compound designed to protect against at least one adverse effect. In one embodiment of the present invention such a delivery system could be a polymer-based system where the inhibiting compound, or protecting compound, is placed within the polymer film used to form the above-mentioned cover. The inclusion of such compounds in a polymer film can be accomplished by any suitable technique such as blending, master batches, nanotechnology, coatings, discrete layers, etc.

In another embodiment, the delivery system of the present invention is a discrete container or delivery system such as a pellet, cup, tank, etc. In still another embodiment, the delivery system of the present invention can be designed to be replenished (either manually, remotely, or automatically).

In one embodiment, the devices of the present invention can be designed to monitor the conditions within the protective enclosure and can respond thereto by providing protection on an as needed basis. In one instance, this can be accomplished by a monitoring system (either a manual or automatic monitoring system). As such, the devices of the present invention can provide long service lives.

For example, the devices of the present invention could be designed to last any where from about 1 month to about 50 years. In another embodiment, the life expectancy of the devices of this portion of the present invention is from about 6 months to about 25 years, from about 1 year to about 15 years, or from about 2 years to about 10 years, or even from about 3 to about 5 years. Here, as well as elsewhere in the specification and claims, individual range limits can be combined to form non-disclosed or non-stated range limits. It will be apparent to one of ordinary skill in the art, upon reading the present specification, that the devices according to this portion of the present invention could be produced with an indefinite range of life expectancies. As such, this portion of the present invention is not limited to the above life expectancies. Rather, one of ordinary skill in the art would, upon reading the present specification and taking into consideration the environment in which the device will be placed, be able to design a device for this portion of the present invention with any desired life expectancy.

Turning to FIGS. 1 through 5, these Figures illustrate exemplary embodiments of the present invention and the parts therein are labeled. With regard to FIG. 6, this Figure illustrates a cross-sectional view along the access seam of FIG. 5. Turning to FIGS. 7 through 17, these Figures illustrate various volatile, or vapor phase, corrosion inhibitor tapes that can be used in conjunction with the present invention.

In still another embodiment, the present invention is a combination of at least two of the following parts:

(1) an external one, two or three layer films that combine the following properties: waterproof, UV resistance, flame retardance, and high strength;

(2) an internal laminated layer impregnated with one or more corrosion inhibitors and/or volatile corrosion inhibitors (VCIs);

(3) at least one internal layer of VCI film separated from external layer (1);

(4) at least one desiccant composition located between internal and external layer;

(5) at least one waterproof zipper with adhesive tapes that are designed to permit inspection and/or reuse of the devices of the present invention; and (6) clamps that permit the devices of the present invention to form, in one embodiment, a cover that conforms to any unpredictable designs and/or dimensions.

In another embodiment, the present invention can contain an inspection window that permits one to visually inspect the interior of a device of the present invention, when such a device is installed. In another embodiment, the present invention utilizes a polymer film that provides one or more of the following properties water resistance, corrosion resistance, flame retardance, etc. It should be noted that the present invention is not limited to any one type of polymer, or polymer film. Rather, any suitable polymer, or polymer film, can be used in conjunction with the present invention. Additionally, any suitable manufacturing technique can be used to form such polymer films (e.g., extrusion, co-extrusion, casting, etc.).

In one embodiment, the devices of the present invention are designed to protect various structures that include at least one metal portion, where such metal portions are formed from steel, stainless steel, aluminum, copper, brass, iron, etc.

Some of the advantages of the devices of the present invention include, but are not limited to, high efficiency rates (up to 80 to 100%), the ability to tailor service lives (e.g., 0.5 to 5.0 years) in either an indoor and/or outdoor environment, including industrial and seaside environments, permit nearly identical simultaneous protection of a large number of joints, the ability to adjust to virtually any geometry, orientation, or shape, the ability to be placed and replaced on an as needed basis, and the ability to reduce manufacturing costs and therefore the costs associated with the protection of such joints.

Joint Covers:

Turning to FIG. 1, FIG. 1 is a cross-sectional illustration of a joint cover 100 according to one embodiment of the present invention. In this embodiment, joint cover 100 comprises a polymer-based cover portion 102 designed to completely enclose, seal and cover, for example, a valve flange 104. In this instance, valve flange 104 is formed from the joining of two pipes 106 and 108 and seals 110 and 112. Joint cover 100 further comprises at least one corrosion inhibitor, or corrosion inhibiting device within the interior area formed by cover portion 102. In one embodiment, the at least one corrosion inhibitor can be located within the polymer material that is used to form cover portion 102. As will be discussed below in greater detail cover portion 102 can be formed from one or more layers of polymer material. Given this, in one embodiment at least one corrosion inhibitor is located within at least one layer of a single, or multi-layer, film that is used to form cover portion 102.

In another embodiment, one or more corrosion inhibiting devices can be attached on the interior surface of cover portion 102 at any suitable interval. Such corrosion inhibiting devices could be, for example, foam-based volatile, or vapor-phase, corrosion capsules. Such capsules are known in the art and as such a detailed explanation thereof is omitted for the sake of brevity. These optional corrosion inhibiting capsules are shown in, for example, FIG. 3 as reference numeral 350. Alternatively, or in addition to, these capsules can contain one or more desiccants (thus the reference number 130) to permit the removal and trapping of any water vapor that may exist within the interior of cover portion 102. In another embodiment, multiple different types of corrosion inhibiting or desiccant capsules 130/350 could be placed at any desirable interval, or even randomly, within the interior of cover portion 102. Capsules 130/350 can be attached to the interior surface of cover portion 102 by any suitable attachment method. Suitable attachment methods include, but are not limited to, glue, double sided tape, heat bonding, ultrasonic bonding, rivets, clips, pins, etc.

In the embodiment illustrated in FIG. 1, valve flange 104 further comprises a valve stem 114 (not to scale) that permits the attachment of a valve wheel (not shown) or some other device to actuate the valve contained within valve flange 104. Due to this type of valve flange 104, this embodiment of the present invention further comprises a valve protection device 116 that is formed from a combination of a rubber cup 118 and a valve stem corrosion protection device 120. Regarding rubber cup 118, rubber cup 118 is designed to fit around the base of valve stem 114 so as to prevent any water, or other liquid, from entering into valve stem housing 119. Such an arrangement seeks to keep valve stem 114 and valve stem housing 119 from corroding and thereof potentially "locking up," or "freezing up," due to corrosion. In addition to rubber cup 118, corrosion that could occur as a result in, or around, the entry point that exists to permit valve stem 114 to emerge from the interior portion of cover portion 102 is reduced and/or eliminated through the use of valve stem corrosion protection device 120 that is designed to fit around valve stem 114.

In one embodiment, valve stem corrosion protection device 120 is a foam-base, or other suitable, corrosion inhibiting device that contains at least one corrosion inhibitor therein. In one instance, valve stem corrosion protection device 120 utilizes one or more suitable-shaped volatile, or vapor phase, corrosion inhibitors to protect the external portion of valve stem 114. As would be apparent to one of skill in the art, any shape can be used so long as adequate protection is conferred to the exposed portion of valve stem 114. In another embodiment, valve stem corrosion protection device 120 could be a suitably shaped device (e.g., a round device) that has a hole therein to permit valve stem 114 to protrude therethrough while relying on some form of corrosion inhibitor to provide protection to exposed portion of valve stem 114. Such protection could be the result of one or more volatile, or vapor phase, corrosion inhibitors, or the result of a device that relies on one or more liquid- or solid-based corrosion inhibitors. For example, device 120 could utilize grease that contains therein one or more corrosion inhibitors.

Regarding cover portion 102, cover portion 102 can be formed from any suitable polymer-based material that is at a minimum watertight and durable. By durable it is meant that the polymer-based material that is used to form cover portion 102 should remain durable and structurally intact for at least about 6 months. By watertight it is meant that water vapor should not be able to pass through the polymer-based material. Suitable polymer-based materials include, but are not limited to, films formed from polystyrenes, polypropylenes, polyethylenes, polyolefins, or combinations of two or more thereof. In another embodiment, the polymer film or films used to form the joint covers of the present invention contain one or more metallized layers (e.g., vapor deposited aluminum layers). Such metallized films are known in the art and as such a discussion thereof is omitted for the sake of brevity. In some embodiments, the polymer-based materials that are used to form cover portion 102 can further include a wide variety of polymer modification compounds including, but not limited to, processing aids, UV stabilizers, flame-retardants, anti-mildew compounds, anti-static compounds, anti-bacterial compounds, dyes, colorants, or any combination of two or more thereof.

As would be appreciated by those of skill in the art, cover portion 102 can be formed to be any suitable thickness. Suitable thickness include films of at least about 0.7 mils, at least about 1 mil, at least about 1.5 mils, at least about 2 mils, at least about 2.5 mils, at least about 3 mils, at least about 5 mils, at least about 10 mils, at least about 25 mils, at least about 50 mils, at least about 75 mils, at least about 100 mils, or even at least about 150 mils. As would be apparent to those of skill in the art, the joint covers of the present invention can be designed to be of any thickness. In some embodiments, and in some environments, a greater thickness is desired and/or needed in order to achieve adequate corrosion protection.

As is discussed above, cover portion 102 can be formed from a polymer film having one, two, three, or even four or more layers. The number of layers in the polymer film used to form cover portion 102 is not important so long as cover portion 102 is both watertight and durable as defined above. Additionally, the method by which the film is made for cover portion 102 is not critical to the present invention. Suitable production methods include, but are not limited to blow molding, casting extrusion, etc.

As can be seen from FIG. 1 the "loose ends" of cover portion 102 of joint cover 100 are secured to pipes 106 and 108 via any suitable attachment method.

Suitable attachment methods include, but are not limited to, tape, twist ties, plastic cable ties, metal cable ties, metal claps, or a combination of two or more thereof. In another embodiment, any tape used in conjunction with a joint cover of the present invention can be a volatile, or vapor phase, corrosion inhibitor-based tape as is shown in FIGS. 7 through 17. In the embodiment of FIG. 1, cover portion 102 is secured to pipes 106 and 108 via a combination of plastic cable ties 122 and 124 and tape strips 126 and 128, respectively. This combination of attachments permit the "loose ends" of cover portion 102 to be secured to pipes 106 and 108 in a watertight and durable manner. In some embodiments, the attachments of the present invention can be reusable or releasable in nature.

In another embodiment, the polymer film used to form cover portion 102 can itself contain at least one volatile, or vapor phase, corrosion inhibitor. Such films are known in the art (e.g., ZERUST film from Northern Technologies International of Circle Pines, Minn.). Such volatile, or vapor phase, corrosion inhibiting films can contain one or more VCI-laden layers therein. Given this, the corrosion protection provided by the present invention can be the result of more than one source of corrosion inhibitor.

In still another embodiment, joint cover 100 can optionally further include one or more desiccants, one or more desiccant compositions can be placed into the polymer film that is used to form cover portion 102, one or more volatile, or vapor phase, corrosion inhibitor capsule that are placed with the interior of cover portion 102, or combinations of two or more thereof.

Figure 2:
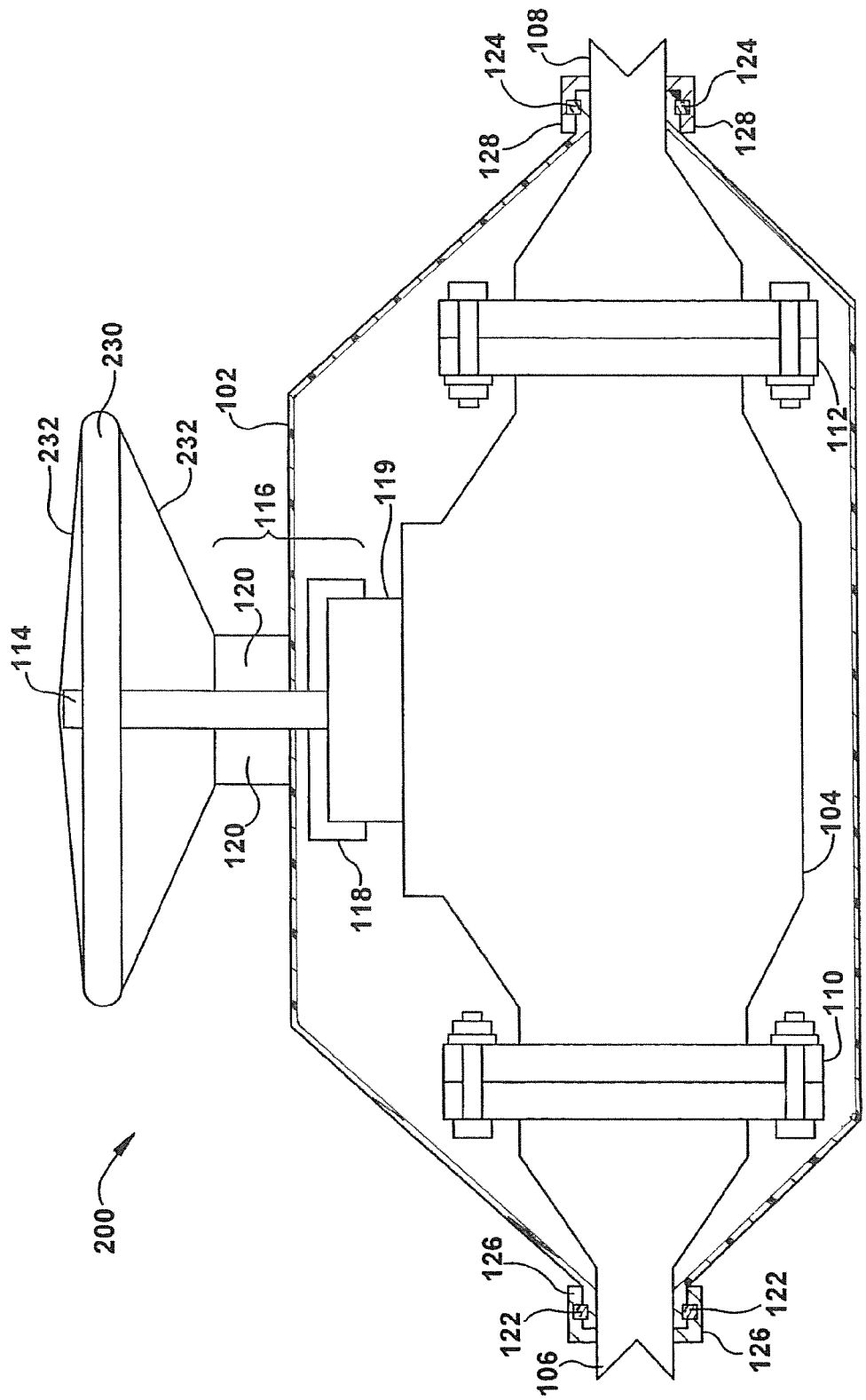
FIG. 2 is a cross-sectional illustration of a joint protection system according to another embodiment of the present invention.

Turning to FIG. 2, FIG. 2 illustrates an additional embodiment 200 of the present invention where like reference numerals are used to reference like parts. In the embodiment of FIG. 2, a flange joint 104 is protected using a joint cover 200 in accordance with another embodiment of the present invention. In the embodiment of FIG. 2, valve wheel 230 is attached to valve stem 114 in order to permit actuation of the valve contained within valve flange 104. Wheel 230 can optionally be protected by a corrosion inhibitor-laden cover 232 that can be, for example, secured to the top of valve stem corrosion protection device 120. In another embodiment, cover 232 can be secured to valve stem 114 using tape, a volatile, or vapor phase, corrosion inhibitor-based tape as is shown in FIGS. 7 through 17, twist ties, plastic cable ties, metal cable ties, metal claps, or a combination of two or more thereof.

Figure 3:
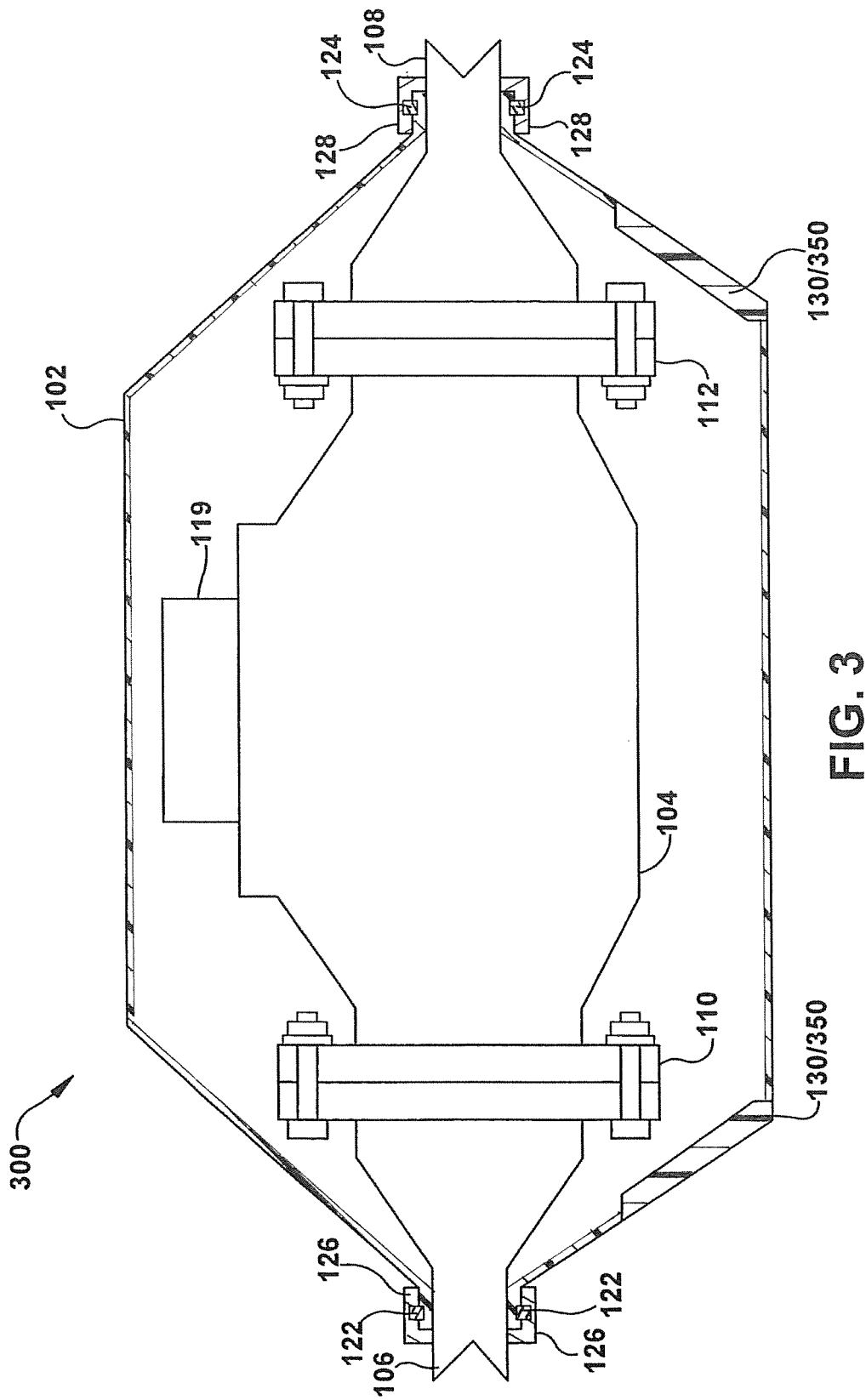
FIG. 3 is a cross-sectional illustration of a joint protection system according to yet another embodiment of the present invention.

Turning to FIG. 3, FIG. 3 illustrates an additional embodiment 300 of the present invention where like reference numerals are used to reference like parts. In the embodiment of FIG. 3, joint cover 300 does not have a valve stem 114 present in valve stem housing 119. As such, in this embodiment valve stem housing 119 does not need to be protected by rubber cup 118, or indirectly by valve stem corrosion protection device 120, since there is no hole needed in cover portion 102 to permit valve stem 114 to pass therethorugh.

Figure 4:
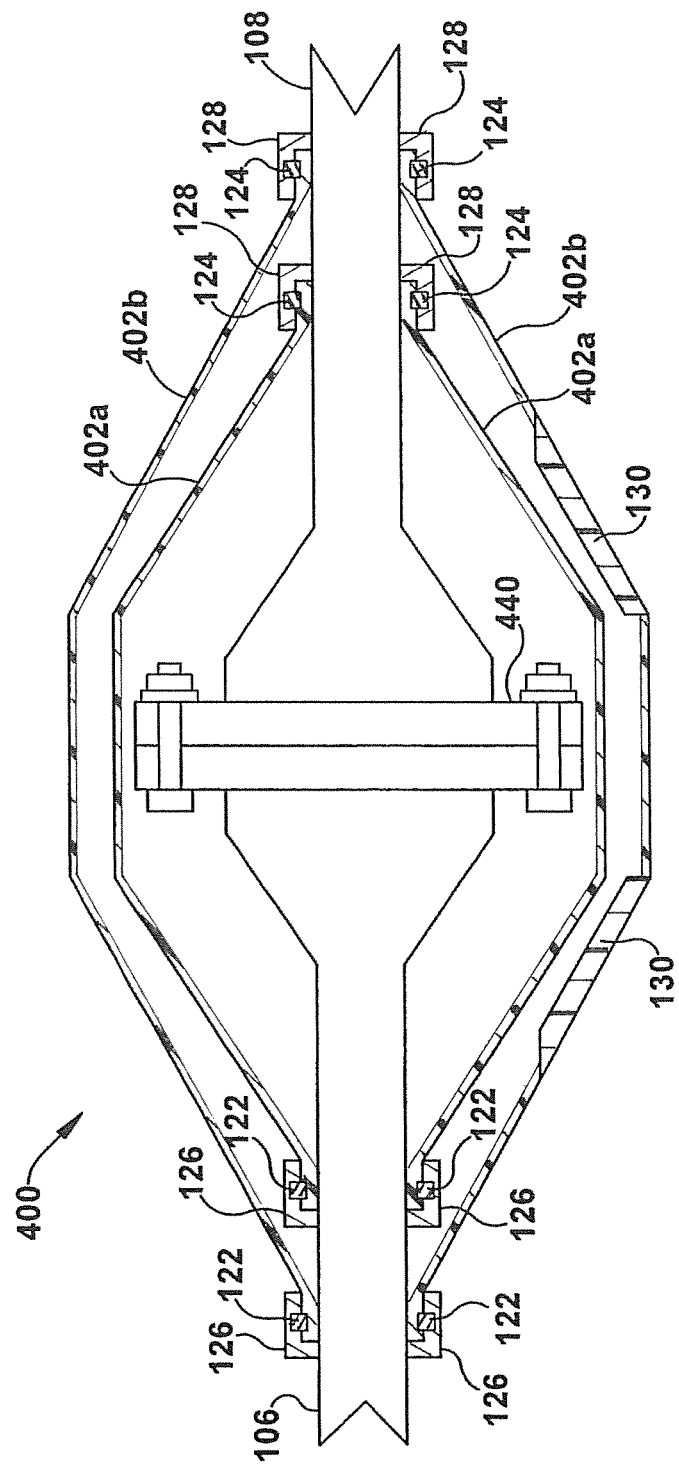
FIG. 4 is a cross-sectional illustration of a joint protection system according to yet another embodiment of the present invention.

Turning to FIG. 4, FIG. 4 illustrates an additional embodiment 400 of the present invention where like reference numerals are used to reference like parts. In the embodiment of FIG. 4, joint cover 400 contains two or more cover portions 402a and 402b designed to doubly protect joint 440. In this embodiment, each of cover portions 402a and 402b are formed from suitable polymer films as discussed above. In one embodiment, cover portion 402a is formed from a polymer film that contains one or more volatile, or vapor phase, corrosion inhibiting compounds therein and cover portion 402b is formed from a polymer film that contains one or more desiccant compounds therein, or has one or more desiccant capsules 130 located on the interior surface thereof. In another embodiment, both of cover portions 402a and 402b contain one or more volatile, or vapor phase, corrosion inhibiting compounds therein, with cover portion 402b further containing at least one desiccant compound or at least one desiccant capsule 130. In still another embodiment, capsules 130 can be selected from any suitable combination of desiccant capsules and corrosion inhibiting capsules so long as at least one of each type is present. As can be seen from FIG. 4, each of covers 402a and 402b are secured in the same manner as discussed above with regard to joint cover 100 of FIG. 1. In another embodiment, three or more individual cover portions can be used to form a joint cover in accordance with the present invention with each individual cover portion being selected from those discussed above.

Turning to FIG. 5, FIG. 5 illustrates an additional embodiment 500 of the present invention where like reference numerals are used to reference like parts. In the embodiment of FIG. 5, joint cover 500 further comprises an access seam 550 and a viewing window 552 and window cover 554. In another embodiment, the films used to form the cover portions of the present invention can be made from a transparent or semi-transparent film, thereby eliminating the need for window 552. The main advantage of window 552, or even a transparent or semi-transparent film, is that the condition of joint 440 can be ascertained without opening cover portion 502a via seam 550. As shown in FIG. 6, in one embodiment, access seam 550 is formed using double sided tape 556 that is positioned between the two loose edges of cover portion 102. In another embodiment, double sided tape 556 can contain therein one or more corrosion inhibitors, or even one or more volatile, or vapor phase, corrosion inhibitors. In another embodiment, access seam 550 can be formed from a zipper device such as those used in lunch bags.

As would be apparent to those of skill in the art, the present invention can be used in conjunction with any type of joint formed between two pieces of pipe. Such joint types include, but are not limited to, flange joints (see FIG. 1), weld joints, valve joints with or without flanges (see FIG. 6), etc. As such the exact nature of the joint to be protected by the present invention is not critical to the operation of the present invention. Rather, the present invention is flexible in nature and can be designed to operate with any type of joint formed between two portions, or pieces, of pipe.

Furthermore, as would be apparent to those of skill in the art, various individual features from the embodiments of FIGS. 1 through 5 can be mixed and matched to form joint covers having different feature sets from those disclosed in FIGS. 1 through 5.

VCI Tapes:

In one embodiment, the present invention provides a rust-resistant tape which can be directly and hermetically adhered to the surface of a metal object to provide a better barrier against oxidation and corrosion. To achieve the above results, in one embodiment, the present invention is rust-resistant tape structure that comprises a main tape body and a rust-resistant component. The rust-resistant component of the present invention can be placed in, on, or around any portion, or portions of the tape structures described herein. In one embodiment, the present invention is a rust-resistant tape that comprises a polymer base layer and an adhesive layer that is located on at least one surface of the polymer base layer to yield a two layer, or sandwich-styled, structure. In this embodiment, the VCI portion of the present invention can be located in, on, or around either the polymer base layer or the adhesive layer. In another embodiment, the VCI component of the present invention is itself a discrete layer in the tape structure and is "carried" in a suitable tie layer located between the one surface of the polymer base layer and the corresponding surface of the adhesive layer.

Turning to the Figures, FIG. 7 is a perspective illustration of a roll of rust-resistant tape in accordance with one embodiment of the present invention. As is shown in FIG. 7, a rust-resistant tape 10 comprises polymer base layer 11 and a VCI containing adhesive layer 12. The adhesive layer is suitable to attach to tape of the present invention to one or more types of metal surfaces.

In one embodiment, polymer base material 11 can be made of polyethylene (PE), polypropylene (PP), polyethylene terephthalate (PET), PET-aluminum film (VMPET), nylon, p-phenylphenol (OPP), or cast polypropylene (CPP). Adhesive layer 12 is any suitable adhesive and can be cast, coated or co-extruded with the polymer base layer to form tape 10. Suitable compounds for adhesive layer 12 include, but are not limited to, rubbers, acrylics, elastomers, polyesters, silicones, polyurethanes, ethylene vinyl acetate, acrylic/epoxy mixtures, silica gels, glues, or suitable mixtures thereof. In another embodiment, the adhesive portion of the present invention can include hot melts, radiation curable adhesives, or the like. In still another embodiment, pressure sensitive adhesives that are permanent, removable, and repositionable are also contemplated as an adhesive layer in the present invention. Those skilled in the art will appreciate that the adhesive layer of the present invention can include, in some embodiments, blocking heat seals, non-blocking heat seals, thermoplastics, crosslinking, or composite adhesives.

Figure 8:
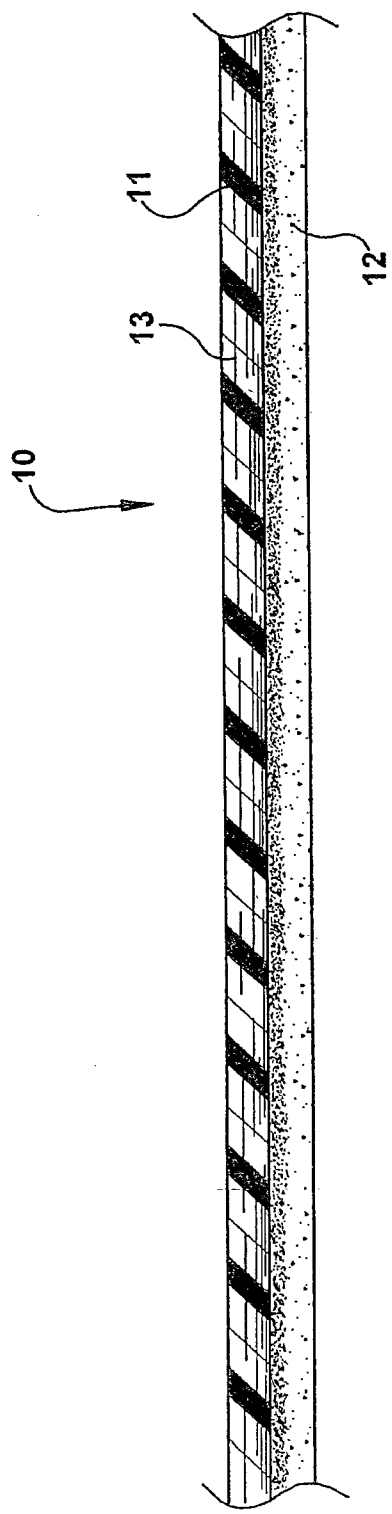
FIG. 8 is a cross-sectional illustration of a VCI tape in accordance with another embodiment of the present invention.

Turning to FIG. 8, FIG. 8 is a cross-sectional illustration of a rust-resistant tape in accordance with another embodiment of the present invention. In this embodiment, tape 10 comprises a polymer base layer 11, an adhesive layer 12 adhered to the lower surface of polymer base layer 11 and a rust-resistant component 13 formed from one or more volatile corrosion inhibitors (VCIs). As can be seen from FIG. 8, rust-resistant component 13 is located in the polymer matrix of polymer base layer 11. The one or more volatile corrosion inhibitors (VCIs) contained in located within polymer base layer 11 can volatilize through adhesion layer 12 to provide anti-corrosion protection in an area surrounding tape 10. In one embodiment, polymer base layer 11 is formed from polyethylene or polypropylene.

In connection with the present invention, suitable VCI compounds for use in connection with the present invention are known in the art and, as such, any suitable volatile or vapor phase corrosion inhibitors can be used in the rust-resistant tapes of the present invention. Suitable VCIs for use in the present invention are disclosed in U.S. Pat. Nos. 4,290,912; 5,320,778; and 5,855,975, which are incorporated herein by reference in their entirety for their teachings of such compounds. For example, useful vapor phase or volatile corrosion inhibitors include, but are not limited to, benzotriazole, and mixtures of benzoates of amine salts with benzotriazole, nitrates of amine salts, and $C_{13}H_{26}O_2N$.

Figure 9:
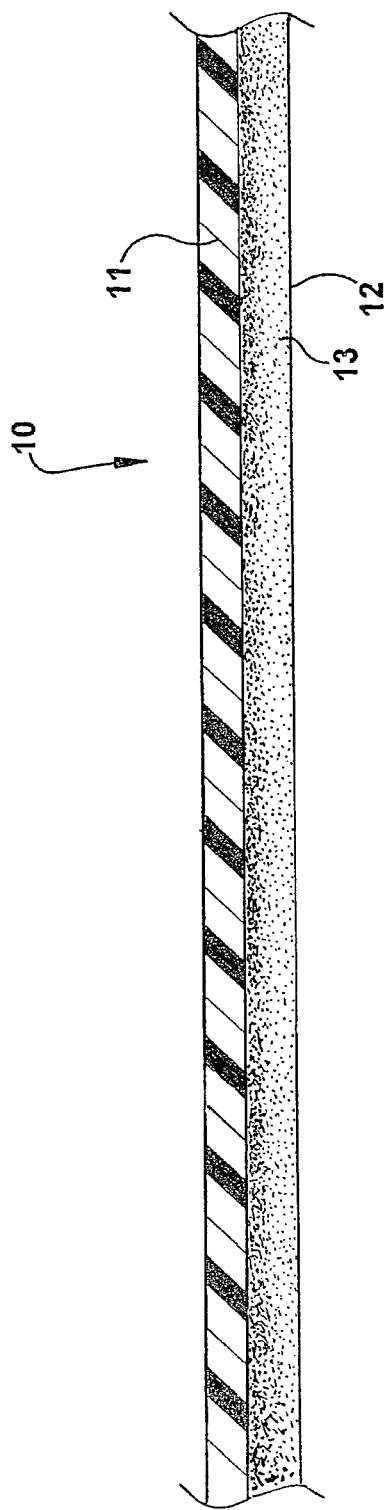
FIG. 9 is a cross-sectional illustration of a VCI tape in accordance with still another embodiment of the present invention.
Figure 10:
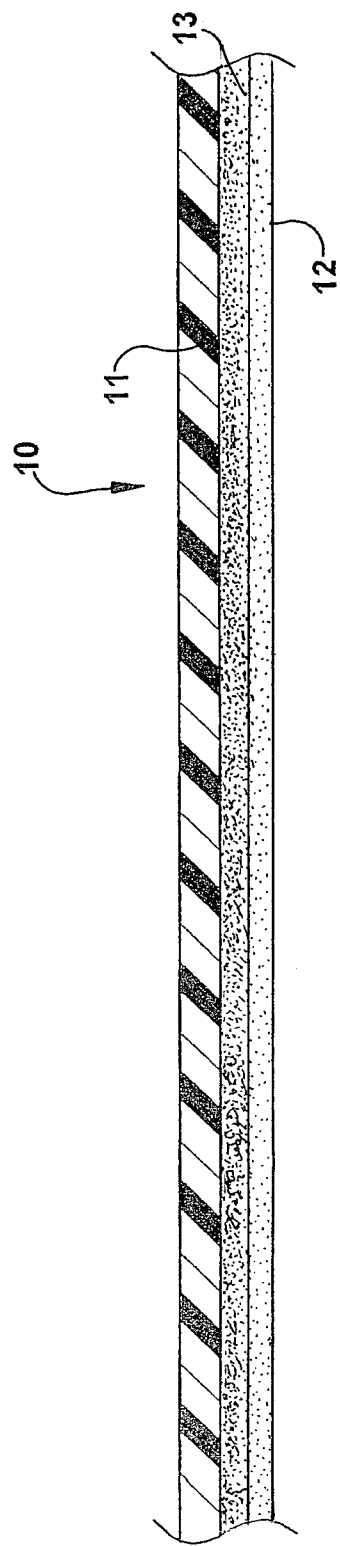
FIG. 10 is a cross-sectional illustration of a VCI tape in accordance with still yet another embodiment of the present invention.

Turning to FIG. 9, FIG. 9 is a cross-sectional illustration of a rust-resistant tape in accordance with still another embodiment of the present invention. In this embodiment, tape 10 comprises a polymer base layer 11, an adhesive layer 12 adhered to the lower surface of polymer base layer 11 and a rust-resistant component 13 formed from one or more volatile corrosion inhibitors (VCIs). As can be seen from FIG. 9, rust-resistant component 13 is located in adhesive layer 12. In another embodiment, rust-resistant component 13 is located in its own layer, where such layer is positioned between the lower surface of polymer base layer 11 and the upper surface of adhesive layer 12 (see FIG. 10). In the case of the embodiment of FIG. 10, rust-resistant component 13 is contained with a suitable "carrier" compound that acts as a carrier for the one or more VCI compounds. Suitable carriers for rust-resistant component 13 are polymer compositions that can act as a tie layer between base layer 11 and adhesive layer 12.

Figure 11:
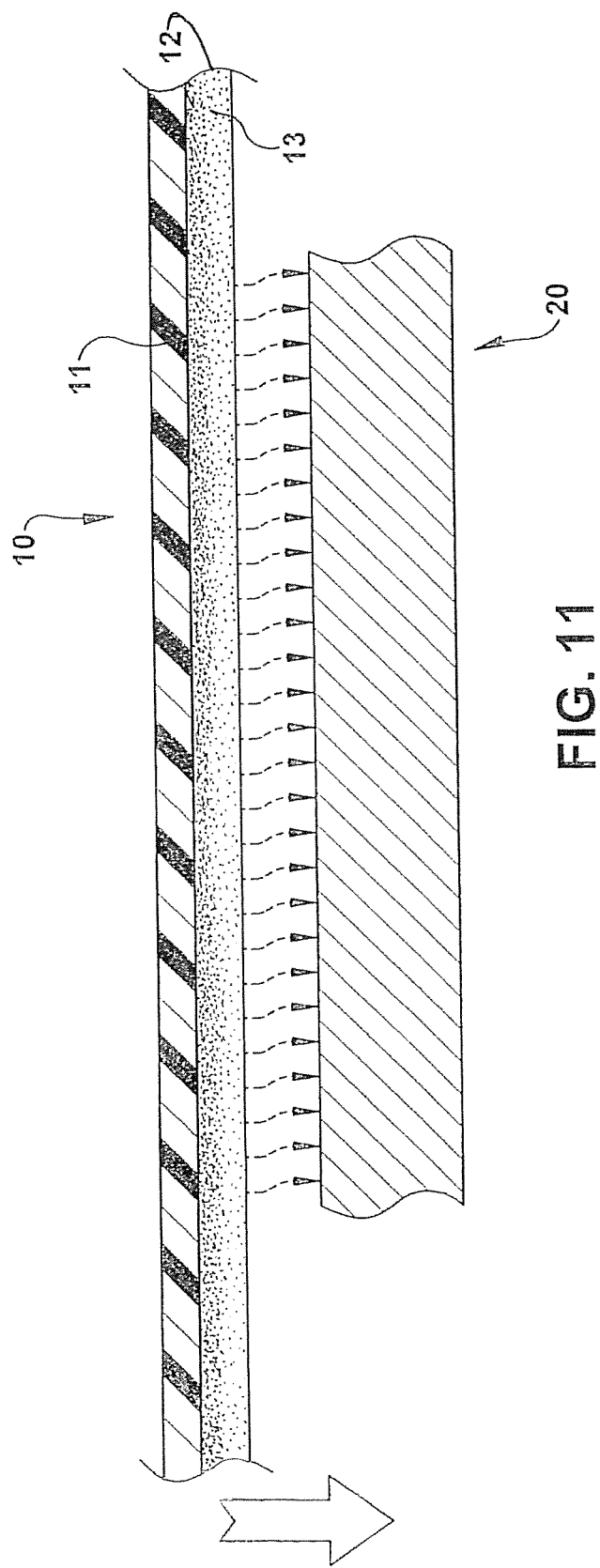
FIG. 11 is a cross-sectional illustration of a VCI tape in accordance with the present invention as it is applied to a metal surface.

Turning to FIG. 11, FIG. 11 is a cross-sectional illustration of the tape 10 of FIG. 9 as it is applied to a metal surface 20. As shown in FIG. 11, tape 10 can be adhered hermetically onto the surface of metal object 20 by the adhesion force of the adhesive layer 12 while the VCI contained in rust-resistant component 13 undergoes gradual glassification and volatilizes over time. This in turn protects the surface of metal object 20 to which tape 10 is applied from corrosive environmental elements (e.g., water vapor, etc.). Additionally, the VCI contained in tape 10 undergoes volatilization until an equilibrium is reached in any gas pockets trapped between the surface of metal object 20 and adhesive layer 12.

Moreover, in the case of a metal object 20 that is protected by a rust-resistant coating such as paint or an electroplated coating, water vapor in the air can still corrode the object's surface through such a coating. This can result in any such coating being sloughed off the surface of the metal object in question. In instance, the rust-resistant tape of the present invention can be adhered, or placed, onto the surface of such metal objects in order to provide additional protection to such surfaces.

Figure 12:
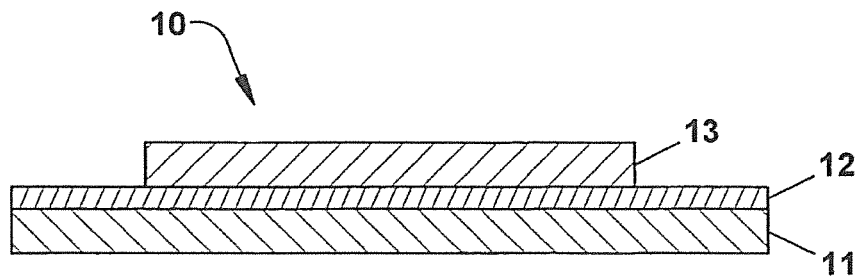
FIG. 12 is a cross-sectional illustration of a VCI tape in accordance with still yet another embodiment of the present invention.

Turning to FIG. 12, FIG. 12 is a cross-sectional illustration of a rust-resistant tape in accordance with still yet another embodiment of the present invention. In this embodiment, tape 10 comprises a polymer base layer 11, an adhesive layer 12 adhered to the upper surface of polymer base layer 11 and a discrete rust-resistant layer 13 adhered to the upper surface of adhesive layer 12, where rust-resistant layer 13 contains one or more volatile corrosion inhibitors (VCIs). In the embodiment of FIG. 12, rust-resistant layer 13 is formed from a combination of a polymer carrier and at least one volatile corrosion inhibitor (VCI).

Figure 13:
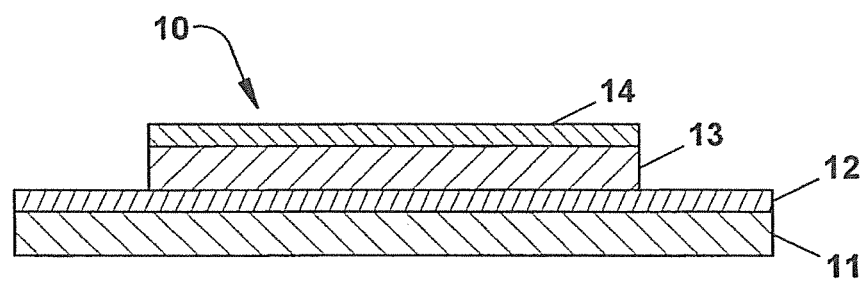
FIG. 13 is a cross-sectional illustration of a VCI tape in accordance with still yet another embodiment of the present invention.

Turning to FIG. 13, FIG. 13 is a variant of the embodiment of FIG. 12 where an additional adhesive layer 14 is formed on the upper surface of discrete rust-resistant layer 13. Given this, a more detailed discussion of this embodiment is omitted for the sake of brevity.

Figure 14:
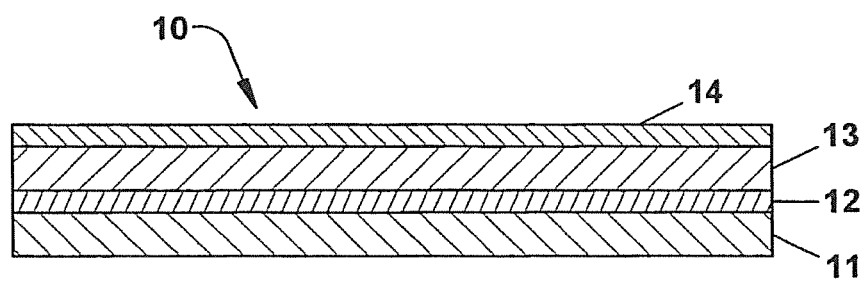
FIG. 14 is a cross-sectional illustration of a VCI tape in accordance with still yet another embodiment of the present invention.

In both of the embodiments illustrated in FIGS. 12 and 13, layer 13 and, if present, layer 14, are formed to be less than the full length of the width of underlying layers 11 and 12. On the other hand, tape 10 of FIG. 14 is an alternative embodiment of the tape of FIG. 13 where all four layers are formed across the whole width of the tape.

Figure 15:
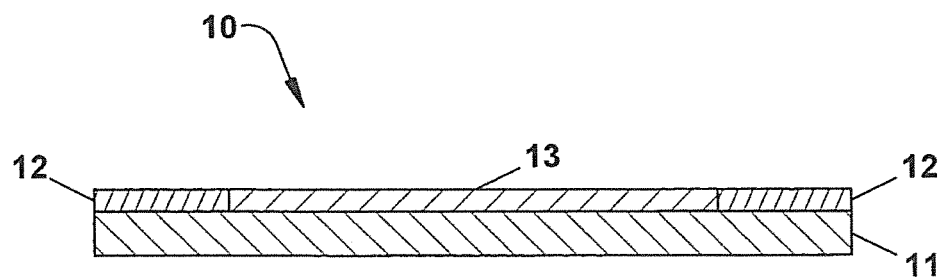
FIG. 15 is a cross-sectional illustration of a VCI tape in accordance with still yet another embodiment of the present invention.

Turning to FIG. 15, FIG. 15 is a cross-sectional illustration of a rust-resistant tape in accordance with still yet another embodiment of the present invention. In the embodiment of FIG. 15, adhesive layer 12 is formed in at least two discrete strips on either side of rust-resistant layer 13. In this embodiment, as can be seen from FIG. 15, rust-resistant layer 13 is in contact with the upper surface of polymer base layer 11.

Figure 16:
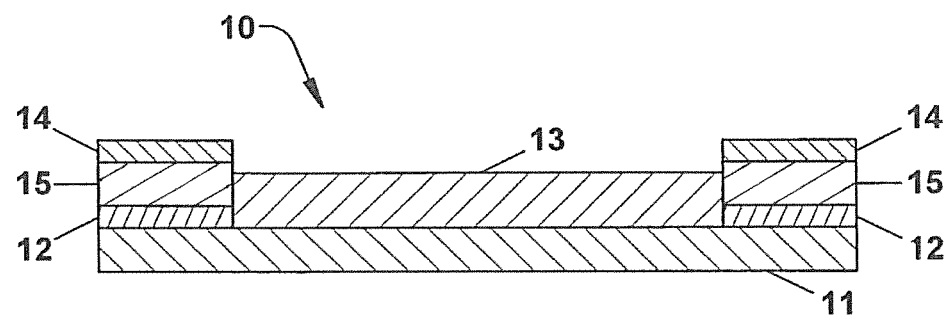
FIG. 16 is a cross-sectional illustration of a VCI tape in accordance with still yet another embodiment of the present invention.

Turning to FIG. 16, FIG. 16 is a cross-sectional illustration of a rust-resistant tape in accordance with still yet another embodiment of the present invention. In the embodiment of FIG. 16, adhesive layer 12 and adhesive layer 14 are formed in at least two discrete strips on either side of rust-resistant layer 13. The discrete portion of adhesive layers 12 and 14 are each separated by a spacer layer 15. In this embodiment, as can be seen from FIG. 16, not only is rust-resistant layer 13 is in contact with the upper surface of polymer base layer 11, the combination of layers 12, 13 and 14 is slightly thicker than rust-resistant layer 13 alone. This creates an air pocket when tape 10 of FIG. 16 is placed onto a metal surface. This, in turn, promotes protection of the metal surface contained within air pocket due to the increased concentration of one or more corrosion inhibiting compounds such as a VCI compound.

Figure 17:
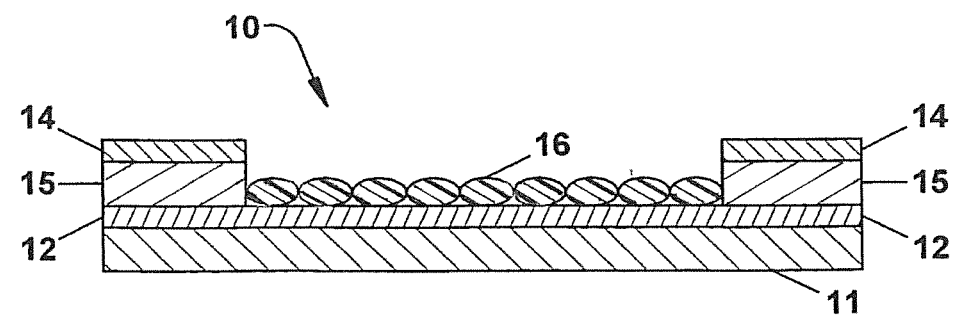
FIG. 17 is a cross-sectional illustration of a VCI tape in accordance with still yet another embodiment of the present invention.

Turning to FIG. 17, FIG. 17 is a cross-sectional illustration of a rust-resistant tape in accordance with still yet another embodiment of the present invention. In the embodiment of FIG. 17, adhesive layer 12 is formed across the complete width of polymer base layer 11 while adhesive layer 14 and spacer layers 15 are again formed in at least two discrete strips on either side of a rust-resistant masterbatch layer 16. In this embodiment, as can be seen from FIG. 17, rust-resistant masterbatch layer 16 is formed on a portion of the upper surface of adhesive layer 12. In this embodiment, the combination of layers 14 and 15 is slightly thicker than rust-resistant masterbatch layer 16 alone, thereby creating an air pocket similar to the embodiment of FIG. 16. Regarding rust-resistant masterbatch layer 16, layer 16 can be activated at any suitable time by the application of, for example, heat to the central portion of tape 16. This is advantageous in that tape 10 can be placed into "service" when appropriate. This in turn increases the service life of tape 10.

Regarding spacer layers 15, these layers are formed from any suitable polymer composition. In one embodiment, suitable polymer compositions for layer 15 include, but are not limited to, polyethylene, polypropylene, polyethylene terephthalates, PET-aluminum film, nylon, p-phenylphenol, or cast polypropylene.

In the case of the polymer carrier composition used to form rust-resistant layer 13 in any of the embodiments of FIGS. 12 through 16, any suitable polymer composition can be utilized to "carry" the one or more volatile, or vapor phase, corrosion inhibitors. Suitable polymers include, but are not limited to, polyethylene, polypropylene, polyethylene terephthalates, PET-aluminum film, nylon, p-phenylphenol, or cast polypropylene. Suitable compounds for adhesive layer 12 of FIGS. 12 through 17 include, but are not limited to, rubbers, acrylics, elastomers, polyesters, silicones, polyurethanes, ethylene vinyl acetate, acrylic/epoxy mixtures, silica gels, glues, or suitable mixtures thereof. In another embodiment, the adhesive portion of the present invention can include hot melts, radiation curable adhesives, or the like. In still another embodiment, pressure sensitive adhesives that are permanent, removable, and repositionable are also contemplated as an adhesive layer in the present invention. Those skilled in the art will appreciate that the adhesive layer of the present invention can include, in some embodiments, blocking heat seals, non-blocking heat seals, thermoplastics, crosslinking, or composite adhesives.

In still another embodiment, any of the tapes 10 can further include one or more non-volatile corrosion inhibitors therein. In one instance, such compounds are soluble in the polymer composition or adhesive composition used to form the various layers of the tapes disclosed herein. In another embodiment, such non-volatile corrosion inhibitors are nano-sized powders and are dispersed within one or more layers that make up the tapes of the present invention. In one embodiment, suitable non-volatile corrosion inhibitors or use in the present invention include, but are not limited to, those compounds described and disclosed in U.S. Pat. Nos. 5,959,021; 5,756,007; 5,154,886; and 4,944,916, the disclosures of which are hereby incorporated by reference in their entireties. For example, suitable non-volatile corrosion inhibitors can include Carboset® CR-780, carbon black (e.g., Black Pearls 2000 obtained from Cabot Corp.), and Ketjen Black (KBEC). In still another embodiment, additional non-volatile corrosion inhibitors besides those stated above are contemplated for use in the tapes of the present invention. Such non-volatile, or soluble, corrosion inhibitors are known in the art, and as such a discussion herein is omitted for the sake of brevity.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A joint cover device comprising:
    an external joint cover comprising one or more layers of a polymer material,
    said external joint cover having loose edges, a watertight and vapor tight access seam formed from said loose edges, said external joint cover capable of completely enclosing and sealing in a watertight and water vapor tight manner at least one joint formed at the confluence of at least two pipes, said external joint cover capable of forming one or more interior areas around said joint, said access seam capable of permitting access to said joint protected by said external joint cover;
    a valve stem and a valve protection device formed of a rubber cup which fits around a base of said valve stem internal to said joint cover and a valve stem corrosion protection device which fits around a portion of said valve stem external to said joint cover and protects said valve stem;
    at least one securing structure per pipe capable of securing the ends of said external joint cover around each of the at least two pipes in a watertight manner, wherein said securing structure is a tape, a twist tie, a plastic cable tie, a metal cable tie, or a metal clamp, or any combination thereof that extends about said entire pipe;
    at least one non-external polymer joint cover located within said external joint cover and separated therefrom comprising either one or more volatile corrosion inhibitors therein or attached to an interior surface thereof or one or more volatile corrosion inhibiting capsules located within said one or more interior areas, or any combination thereof; and
    said one or more volatile corrosion inhibitors or capsules, capable of being transferred through said one or more interior areas to said joint and condensing thereon so that said joint is protected from corrosion.

2. The joint cover device of claim 1, wherein said at least one polymer layer of said external joint cover is formed from polystyrene, polypropylene, polyethylene, or a polyolefin other than said polypropylene and said polyethylene, or combinations of two or more thereof.

3. The joint cover device of claim 2, wherein said access seam is formed from a doubled sided tape, or a zipper, or a combination thereof.

4. The joint cover device of claim 3, wherein said external cover is flame resistant and is UV resistant.

5. A joint cover device comprising:
    an external joint cover comprising one or more layers of a polymer material, said external joint cover having loose edges, a watertight and vapor tight access seam formed from said loose edges, said external joint cover capable of enclosing and sealing in a watertight and water vapor tight manner at least one joint formed at the confluence of at least two pipes, said external joint cover capable of forming one or more interior areas around said joint;
    a valve stem and a valve protection device formed of a rubber cup which fits around a base of said valve stem internal to said joint cover and a valve stem corrosion protection device which fits around a portion of said valve stem external to said joint cover and protects said valve stem;
    at least one securing structure per pipe capable of securing the ends of said external joint cover around each of the at least two pipes in a watertight manner, wherein said securing structure is a tape, a twist tie, a plastic cable tie, a metal cable tie, or a metal clamp, or any combination thereof that extends about said entire pipe;
    at least one non-external joint cover located within said external joint cover and separated therefrom comprising either one or more volatile corrosion inhibitors therein or attached to an interior surface thereof, or one or more volatile corrosion inhibiting capsules located within said one or more interior areas, or both, or any combination thereof; and one or more desiccant compounds attached to said non-external joint cover, or located between said external joint cover and said non-external joint cover, or located in said one or more interior areas; and
    said one or more volatile corrosion inhibitors or capsules capable of being transferred through said one or more interior areas to said joint and condensing thereon so that said joint is protected from corrosion.

6. The joint cover device of claim 5, wherein said at least one polymer layer of said external joint cover is formed from polystyrene, polypropylene, polyethylene, or a polyolefin other than said polypropylene and said polyethylene, or any combination thereof.

7. The joint cover device of claim 5, wherein said external cover is UV resistant and flame resistant.

8. The joint cover device of claim 5, wherein said access seam is formed from a doubled sided tape, or a zipper, or a combination thereof.

9. The joint cover device of claim 8, wherein said external cover contains at least one transparent area.

10. The joint cover device of claim 5, wherein said joint cover comprises two or more layers, and wherein said one or more volatile corrosion inhibitors is located in the interior layer of said multiple layers.

11. A joint cover device comprising:
- a joint cover comprising one or more layers of a polymer material,
- said joint cover having loose edges, a watertight and vapor tight access seam formed from said loose edges, said joint cover capable of completely enclosing and sealing in a watertight and water vapor tight manner at least one joint formed at the confluence of at least two pipes, said joint cover capable of forming one or more interior areas around said joint, said access seam capable of permitting access to said joint protected by said joint cover;
- a valve stem and a valve protection device formed of a rubber cup which fits around a base of said valve stem internal to said joint cover and a valve stem corrosion protection device which fits around a portion of said valve stem external to said joint cover and protects said valve stem;
- at least one securing structure per pipe capable of securing the ends of said joint cover around each of the at least two pipes in a watertight manner, wherein said securing structure is a tape, a twist tie, a plastic cable tie, a metal cable tie, or a metal clamp, or any combination thereof that extends about said entire pipe;
- at least one said joint cover layer having either one or more volatile corrosion inhibitors therein or attached to an interior surface thereof or one or more volatile corrosion inhibiting capsules located within said one or more interior areas, or attached to said interior surface of said joint cover, or any combination thereof; and
- said one or more volatile corrosion inhibitors or capsules, capable of being transferred through said one or more interior areas to said joint and condensing thereon so that said joint is protected from corrosion.

12. The joint cover device of claim 11, wherein said at least one polymer layer of said joint cover is formed from polystyrene, polypropylene, polyethylene, or a polyolefin other than said polypropylene and said polyethylene, or combinations of two or more thereof.

13. The joint cover device of claim 12, wherein said access seam is formed from a double sided tape, or a zipper, or a combination thereof.

14. The joint cover device of claim 13, wherein said external cover is flame resistant and is UV resistant.

15. The joint cover device of claim 14, including one or more desiccant compounds attached to said interior layer of said joint cover, or located within said one or more interior areas.

16. The joint cover device of claim 12, wherein said joint cover comprises two or more layers, and wherein said one or more volatile corrosion inhibitors is located in the interior layer of said multiple layers.

17. The joint cover device of claim 16, including one or more desiccant compounds attached to said interior layer of said joint cover, or located within said one or more interior areas.

* * * * *